United States Patent [19]
Richter

[11] Patent Number: 5,129,110
[45] Date of Patent: Jul. 14, 1992

[54] SELECTABLE TOILET-WATER-LEVEL FLUSHING SYSTEM

[76] Inventor: Robert A. Richter, 1231 Golden Rain Rd. #70G, Seal Beach, Calif. 90740

[21] Appl. No.: 552,912

[22] Filed: Jul. 16, 1990

[51] Int. Cl.$^5$ .......................... E03D 1/14; E03D 1/00
[52] U.S. Cl. ........................................... 4/324; 4/415
[58] Field of Search ............... 4/324, 326, 378, 392, 4/393, 403, 404, 415, 325, 395; 137/289, 534; 251/338

[56] References Cited

U.S. PATENT DOCUMENTS

| | | | |
|---|---|---|---|
| 129,138 | 7/1872 | Jewell et al. | 137/534 |
| 941,478 | 11/1909 | Watson | 137/534 |
| 2,504,555 | 4/1950 | Loether | 4/404 |
| 2,520,059 | 8/1950 | Reeves | 4/404 |
| 2,769,457 | 11/1956 | Wittenberg | 137/512 |
| 3,036,313 | 5/1962 | Jenkins | 4/324 |
| 4,364,129 | 12/1982 | Schonger | 4/324 |

*Primary Examiner*—Henry J. Recla
*Assistant Examiner*—David J. Walczak

[57] ABSTRACT

A selectable toilet-water-level flushing system (10) that allows a toilet user to selectively control the quantity of water that is used for a toilet flush. The quantity of water used depends on whether liquid or solid waste is to be flushed. For liquid waste, only a partial flush is necessary; for solid waste, a full-flush is used. The system (10) functions by performing a simple modification to the toilet flush valve (12). The modification consists of inserting into the valve opening a weight (16) that causes the normally buoyant valve to become non-buoyant. Since the valve is non-buoyant, the lifting of the valve from the valve seat (36) is totally controlled by the toilet flush handle (38) which, in turn, is controlled by the user. Typically, for a partial flush the handle (38) is temporarily held in its depressed position for two seconds while for a full flush, it is held for four seconds. Over a period of time, by using partial flushes a large savings of fresh water can be realized.

3 Claims, 4 Drawing Sheets

SELECTABLE TOILET-WATER-LEVEL FLUSHING SYSTEM

TECHNICAL FIELD

The invention pertains to the general field of toilet flushing systems and more particularly to a toilet-water-level flushing system that allows the user to select the quantity of water that is to be used for the flush.

BACKGROUND ART

Most toilets in use today, consist of two main parts; an upper part which holds water, referred to as a tank section, and a lower part consisting primarily of a bowl with a volume of water which is designed to receive human waste products. Once the waste products have been deposited in the bowl, they are removed by releasing the water held in the upper tank section into the bowl. The released water removes the waste products to a collection system, such as a sewer system or a septic tank, and then refills the bowl so that there remains standing a volume of water. Waste products consists of solid and liquid wastes and in presently available toilets, one full flush is utilized to carry away both solid and liquid wastes, even when there is only liquid waste in the toilet bowl. In these standard toilets, a full complete flush is effected with each flush and the total contents of the water in the tank section is drained into the bowl and then out into the sewer system.

One of the most often used toilet flushing systems comprises a ball-cock valve assembly that controls the inlet of water into the tank section. A float ball is connected to the ball-cock valve by means of a float arm. As the toilet tank fills with water, the buoyant float ball rises in the tank section. The motion of the float ball is transmitted to the ball-cock through the float arm until at a predetermined water level the ball-cock assembly shuts off the water inlet to the tank. This corresponds to a generally horizontal position of the float arm. In most toilets, the water level in the water tank may be adjusted by means of a screw set mechanism provided in the ball-cock assembly. This adjustment, however, is limited in range and requires that the tank lid be lifted to obtain access to the ball-cock. Once the water level in the tank is set, the adjustment is usually thereafter ignored. The same volume of water is therefore discharged from the tank every time that the flushing system is tripped, regardless of the volume which may be actually required to successfully flush the toilet.

It is a well known fact that the largest use of water in most households and in many office buildings is for flushing toilets. Because flushing is carried out with the full capacity of the water in the water tank, the water usage is wasteful and is not required. Considerable interest has been centered on reducing the water used when toilets are flushed, especially at times and in places when there is a water deficiency or periods of drought.

Several water saving methods have been used to conserve water during the toilet flushing operation. One such method has been to deposit a filled water bag or a solid object, such as a brick, in the water tank to displace an equivalent volume of water in the tank, to thus reduce the volume of water consumed with each flushing. Another common method is to lower the float valve to allow the ball-cock valve to close at a reduced water level. These methods to conserve water in many cases are self-defeating, in that, the effectiveness of the flush is diminished and it may be necessary to flush twice to effect a sanitary flush. Additionally, such methods represent a compromise in that the volume of water is set and is not readily adjustable.

Other flush saving methods have included modifying a flapper valve and a tank ball valve by inserting into the valve various types of foam fillers. An analysis of this method, conducted by the applicant, determined that open-pore foam partially functioned; closed-pore foam would not work at all as the inside of the foam would not absorb the water. The analysis further disclosed the following.

The specific gravity of water is 1.00 while the specific gravity of the foam and the neoprene rubber is between 0.96 and 1.1. Therefore, the foam modified valve assembly is slightly over the specific gravity of water. The problem here is to be sure that the valve is completely filled with foam and that the foam is completely filled with water. If the smallest air space is present, the slight margin of weight is overcome and the valve will float, thus defeating the requirement for a quick closing valve. Further investigation revealed that the only way to completely fill the foam was by squeezing and releasing it under water. The foam never completely filled when installed (open side down) as air is trapped inside the valve and the foam sponge cannot fill without displacing the trapped air.

The investigation also revealed that often the valve remains "seated" in the water delivery port of the tank section for a period of time. When this period is approximately eight hours, the water drains out of the sponge and into the open space under the tank and the water pressure "head" deforms the valve to conform to the seat. This condition squeezes out some of the water in the sponge. With this additional loss of water the specific gravity of the valve is reduced to much less than water. Thus, when the valve is actuated after the seating period, the valve floats, defeating the water saving purpose of the invention. Once the water has drained out, the valve must be removed to refill the sponge because in the floating position, only half of the valve is submerged and the trapped air will not allow the sponge to refill. The specific gravity at this point, is less than 1.0 and therefore, the valve continues to float negating the water saving feature.

Solid foams were also checked and where determined not to be feasible. The tank valve seats are of two types: metal rings or "cast in" the porcelain. Both are subject to out-of-round conditions due to manufacturing tolerances and from nodules grown from the salts in the water. Both of these conditions require that the valve be soft enough to conform to the valve seat. When a solid foam is used, the weight of the foam interferes with the required deformation. The solid foam also presents the same problem, as stated above, in filling the solid foam completely and with the water draining out when the valve is closed for an extended period of time.

A search of the prior art did not disclose any patents that read directly on the claims of the instant invention however, the following U.S. patents were considered related:

| U.S. Pat. No. | INVENTOR | ISSUED |
| --- | --- | --- |
| 4,837,867 | Miller | 13 June 1989 |
| 4,700,413 | Lopez | 20 October 1987 |
| 4,483,024 | Troeh | 20 November 1984 |
| 4,364,129 | Schonger | 21 December 1982 |
| 4,268,924 | Price et al. | 26 May 1981 |

-continued

| U.S. Pat. No. | INVENTOR | ISSUED |
| --- | --- | --- |
| 4,216,555 | Detjen | 12 August 1980 |

The Miller patent discloses a dual flush system for toilets to effect a full flush or a partial flush of the toilet to carry away liquid wastes. The system functions by partially opening the main valve, located in the water holding tank of the toilet, for a period of time that is determined by the operator. When the valve is opened slightly, downward pressure on the valve and suction forces the water passing between the valve and valve seat to exert a downward force on the valve that causes the valve to pull back into a closed position after opening. Only when the valve is raised to a position where its buoyancy exceeds the downward pressure is a full flush effected. The system includes the means to limit the upward lifting of the valve by limiting the lengthwise travel of a cord attached to the valve. The cord is attached on its other end to a flush handle and lever.

The Lopez patent discloses a toilet flushing mechanism that provides high and low water volume selectability. The invention consists of an articulated float arm that is normally bent at an angle by a detent mechanism to maintain a low water level in the toilet water tank. A linkage is provided to the exterior of the tank for releasing the detent mechanism. When so released, the buoyant float straightens the arm thereby admitting additional water into the tank to obtain a more vigorous flushing action.

The Troeh patent discloses a variable flush for a toilet water tank wherein the valve is operated by the same toilet trip lever as the usual single level types. The operational differences, presented by the invention, is that a light pressure on the toilet trip handle causes the two-level flush valve to yield a small flush whereas a heavier pressure will cause a full flush. The invention includes a first float connected to the outer end of the valve arm to maintain the valve in an open position until the water level falls below a predetermined level. A second float is carried on a float arm pivoted intermediate its ends to the support.

The Schonger patent discloses a toilet flush system that allows a user to manually control the amount of water used for a toilet flush. The system uses a modified flapper valve, a tank ball valve or other type valves to control the closing of a reservoir outlet at selected times prior to or upon completion of the normal flush cycle. The tank ball or flapper valve is modified to overcome its buoyancy such that it rapidly closes the tank reservoir to thereby terminate the flush cycle when the handle of the toilet is released. By maintaining the handle in the operated position, the individual flush cycle can be controlled dependent on the waste to be disposed of. The buoyancy of the valve is overcome by inserting a water absorbing material, such as a sponge, into the valve, when the valve is primed, the sponge increases the weight of the valve.

The Price patent discloses a toilet flushing apparatus that incorporates an inventive water control valve that is used in a syphon-operated closet bowl flush tank having an inverted bell containing a liftable plunger disc to initiate syphon action the valve allows a user to select between a light or a heavy flush. A light flush is derived from an initial operation followed by a quick release. A heavy flush is derived from an initial operation which is then sustained. To fit the valve to an existing inverted bell, a hole is cut into the top of the bell and the valve is lowered through the hole.

The Detjen patent discloses a dual-flush toilet system that provides either a full flush or a partial flush at the option of the user. When a full flush is desired, the flush handle is actuated normally; if a partial flush is desired, the handle is held in a depressed condition for two to three seconds. The partial flush is produced when a buoyant reseating weight floats down with the falling level of the liquid in the tank. The weight depresses the flush ball and prematurely reseats in its outlet seat when only part of the liquid has been discharged from the tank. The reseating weight is provided with a latch actuated by the flush handle. For a full flush, the latch is released but is immediately re-engaged before the reseating weight moves downwardly in the tank.

DISCLOSURE OF THE INVENTION

The selectable toilet-water-level flushing system allows a toilet user to easily select the quantity of water that will be used to flush the toilet. If liquid waste is to be flushed, only a partial flush is necessary. Only when disposing of solid waste is a full flush necessary.

Conventional toilet water tanks are designed to hold from three to eight gallons of water. In a family of four, it has been estimated that 20,000 gallons of fresh water could be saved yearly if the average flush were limited to between 2 and 2.5 gallons per flush. By utilizing the inventive system, this average can be maintained. Additionally, this water savings, when multiplied by the hundreds of toilets used in any given community would greatly reduce the burden on the communities water resources and help to reduce the overload in sewers and septic tanks.

The selectable toilet-water-level flushing system makes use of a simple modification to an existing toilet flush valve that renders the valve non-buoyant. The modification, which can be made to either a flapper valve or a tank-ball valve, consists of inserting a weight into the existing opening in the toilet flush valve. The only requirements placed on the weight is that (1) it must fit loosely to allow the valve to remain resilient around its lower perimeter so that the valve conforms to the contour of the valve seat to assure a water-tight seal and (2) it must be made of a material that has a specific gravity that is greater than water. Typically a weight weighing between 2 and 6 ounces (57.1 and 171.4 grams) will be effective.

To operate the inventive system, the flush handle on the toilet tank, which is mechanically linked to the flush valve, is depressed to allow the valve to lift from the valve seat and commence the flush. The handle is held in the depressed position for a period of time that is selected by the user and is dependent upon the type of waste that is to be flushed. For liquid waste, a time period of 2 seconds is recommended while for disposing of solid waste a time period of 4 seconds is used to effect a full flush.

In view of the above disclosure, it is the primary object of the invention to provide a toilet flushing system that saves water by allowing the toilet user to selectively determine the amount of water that is to be used for a specific toilet flush.

In addition to the primary object, it is also an object of the invention to provide a toilet flushing system that:
saves water while retaining the effectiveness of the flush, requires no skill or special tools to install,
requires no adjustments and/or periodic service,
can be used to modify existing toilets or can be built-in to newly manufactured toilets,
is simple to use,
is cost effective from both a manufacturing and consumer viewpoint,
does not require any modifications to the toilet water tank or toilet bowl.

These and other objects and advantages of the instant invention will become apparent from the subsequent detailed description of the preferred embodiment and the appended claims taken in conjunction with the accompanying drawings.

BEST MODE FOR CARRYING OUT THE INVENTION

Figure 1:
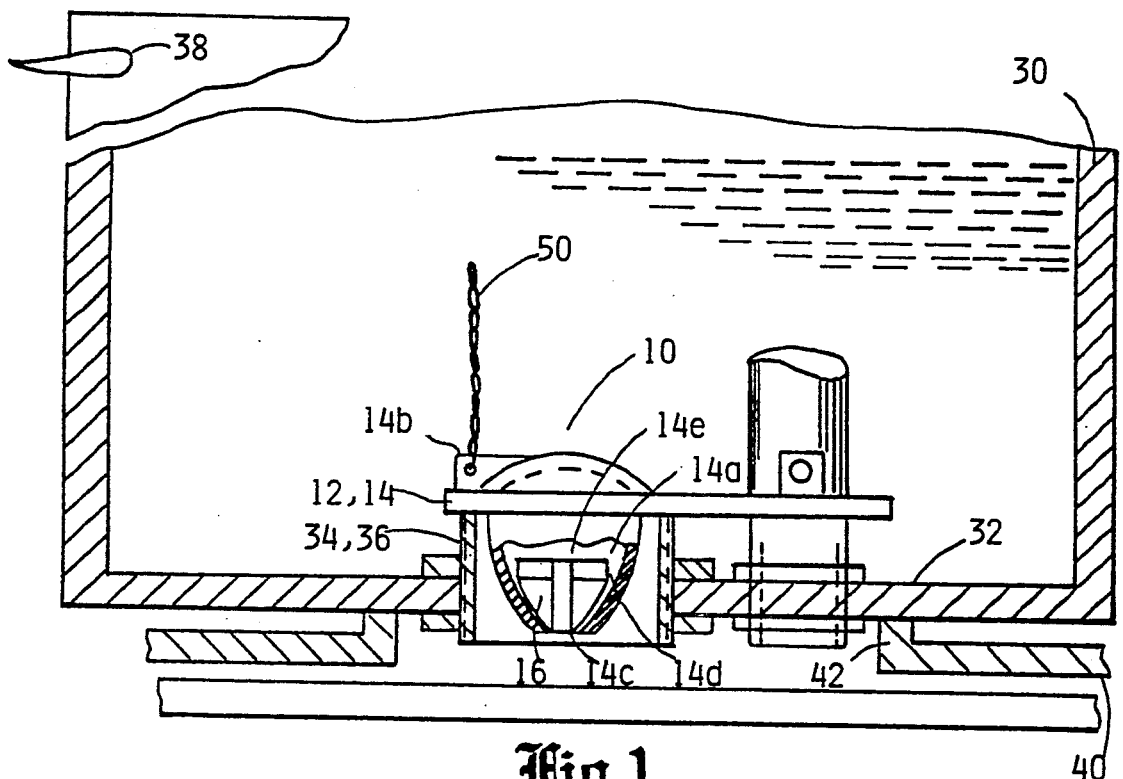
FIG. 1 is an elevational view in partial section of a modified flapper valve shown installed in a toilet water tank in its seated (closed) position.

The best mode for carrying out the selectable toilet-water-level flushing system 10 is presented in terms of a preferred embodiment that is designed to allow a toilet user to manually select the quantity of water used for a toilet flush. The selected quantity of water is dependent upon the type of waste that is to be disposed; for liquid waste, a partial flush is recommended while for solid waste, a full flush would be used. The quantity of water available for the toilet flush is controlled by the user by first depressing and holding the flush handle to commence the flush and then releasing it to terminate the flush.

The system 10, as shown in FIGS. 1-10 is comprised of a modified flush valve 12 that can consist of either a modified flapper valve 14 or a modified tank ball valve 18. In either case, the flush valve 12 operates in combination with a conventional toilet assembly, that consists of a toilet tank 30 and a toilet bowl 40 that includes on its upper surface a bowl drain 42. The tank 30 includes on its bottom surface 32 a tank drain 34 that has an upwardly extending valve seat 36 and is further comprised, in part, of a flush handle 38 that is connected via a mechanical linkage 50, to an attachment point 14b or 18b on the top of the flush valve 12. The handle 38 allows manual control of the flush valve position. The tank 30 is attached to the bowl 40 by interfacing the bowl drain 42 with the tank drain 34. Thus, when a toilet flush occurs, the flush water flows into the toilet bowl 40, from where the water is routed into a sewer system or septic tank.

The novelty of the invention is centered on the replacement of a normally buoyant flush valve 12 with the modified flush valve that is not buoyant. The system 10 will operate with either the modified flapper valve 14, as shown in FIGS. 1, 7A, 7B and 9 or the modified tank-ball valve 18 as shown in FIGS. 2, 8 and 9.

Figure 3:
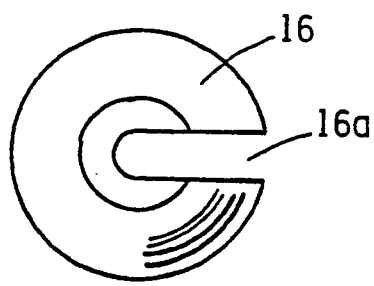
FIG. 3 is a plan view of a weight as used with a flapper valve.
Figure 4:
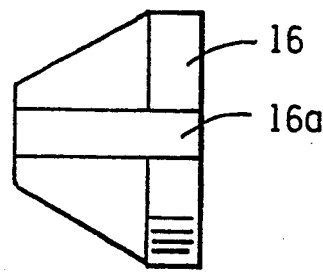
FIG. 4 is an elevational view of the weight shown in FIG. 3.
Figure 7B:
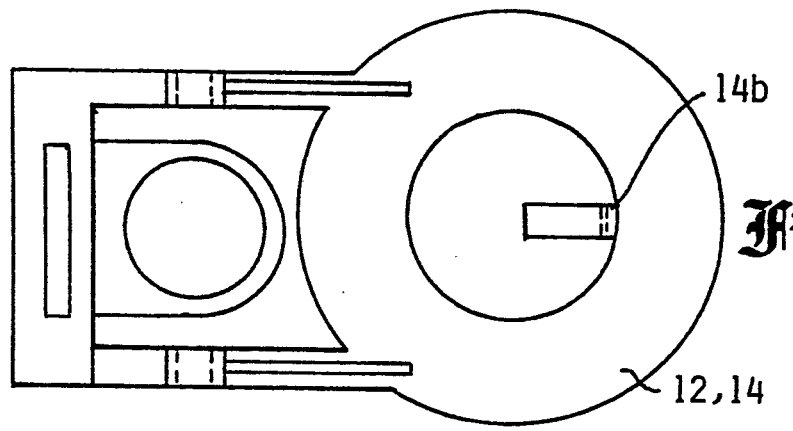
FIG. 7B is a top plan view of the modified tank ball valve.
Figure 7A:
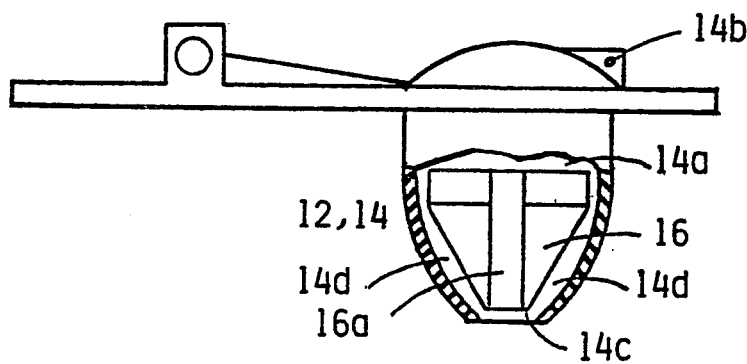
FIG. 7A is an elevational view in partial section showing the placement of a weight in a modified flapper valve.

The modified flapper valve 14 is made of a resilient material, such as rubber and has a hollow interior 14a. On the upper surface of the valve is located an attachment point 14b that attaches to the finish handle 38 via the mechanical linkage 50 and on its bottom surface, as best shown in FIG. 9, is located an opening 14c. To modify the valve 14, a weight 16, as best shown in FIGS. 3 and 4, is inserted through the opening 14c and into the hollow interior 14a of the valve as best shown in FIGS. 7 and 9. As shown in these figures, the weight 16 is smaller than the inside of the valve and fits loosely within the valve interior. Thus, allowing a space 14d to be created between the circumferential perimeter of the weight and the inner surface of the valve. This space 14d allows the valve to remain resilient near its lower perimeter so that the valve can conform 14e and seal against the contour of the valve seat 36 when the valve is in its seated (closed) position. If such conformance is not present, the valve will not seat and seal properly against the valve seat causing leakage as described in the BACKGROUND ART section.

Figure 2:
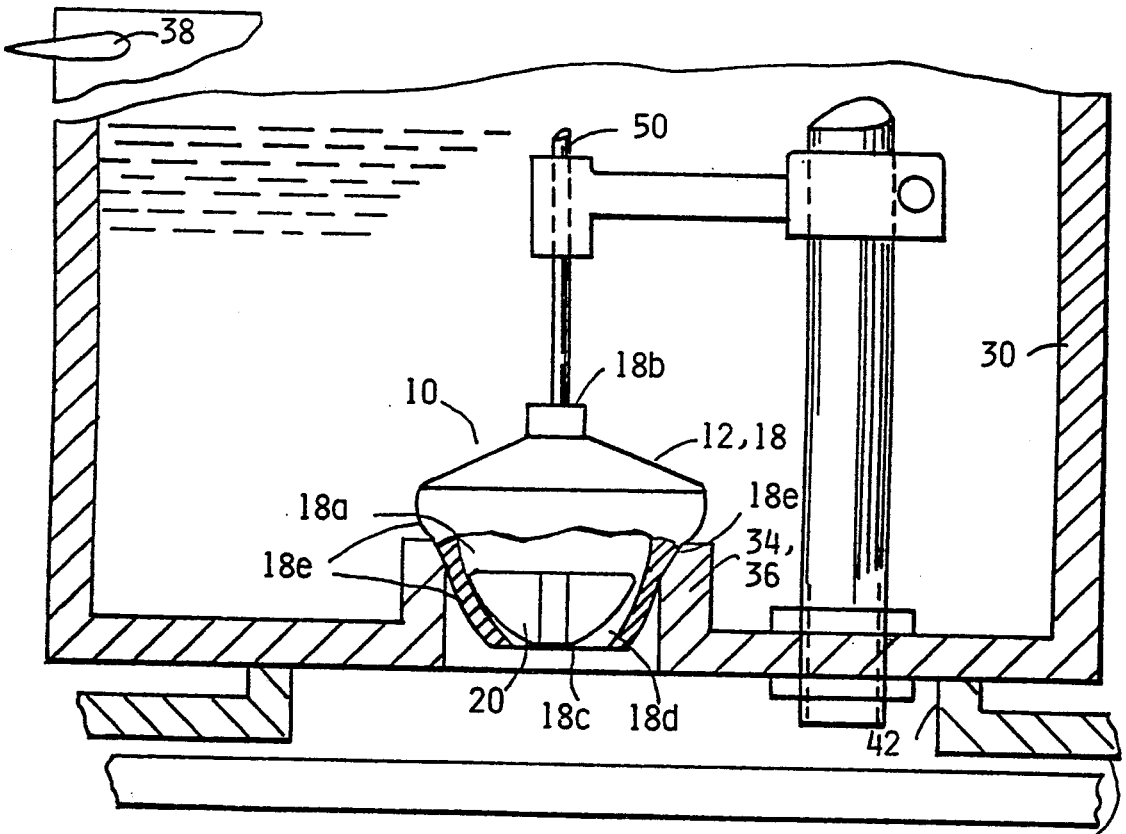
FIG. 2 is an elevational view in partial section of a modified tank-ball valve shown installed in a toilet water tank in its seated (closed) position.
Figure 8:
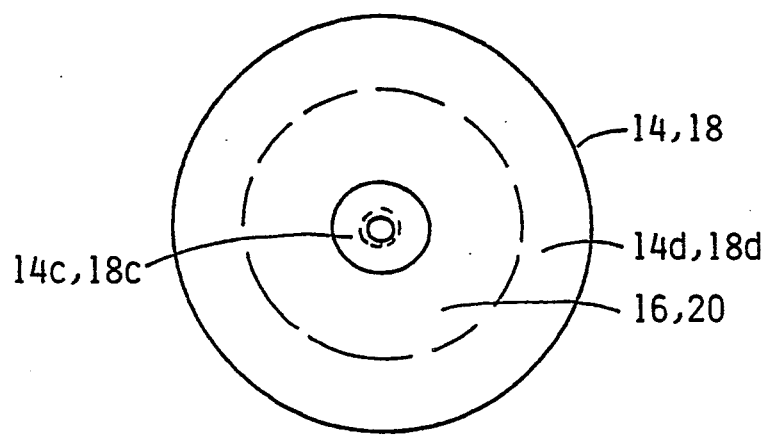
FIG. 8 is an elevational view in partial section showing the placement of a weight in a modified tank-ball valve.
Figure 9:
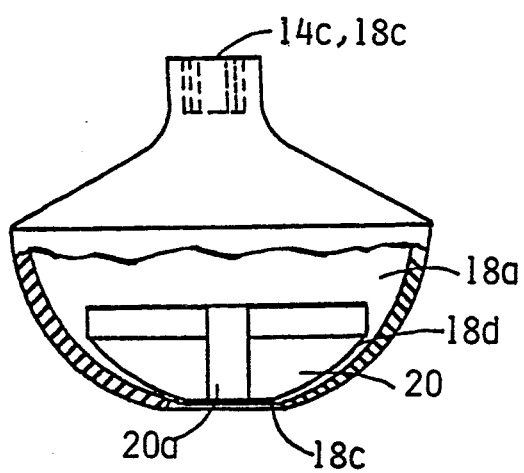
FIG. 9 is a plan view of a weight installed in either a modified flapper valve or a tank-ball valve.

The tank-ball valve 18, as shown in FIGS. 2 and 8, is also made of a resilient material, has a hollow interior 18a with an opening 18c and an attachment point 18b on its upper surface that attaches to the flush handle 38 via the mechanical linkage 50. As with the flapper valve, a weight 20 is inserted into the valve interior through the valve opening 18c. This weight also fits loosely to allow the valve, as described above, to properly seat itself against the valve seat 36 to provide a water-tight seal.

Figure 5:
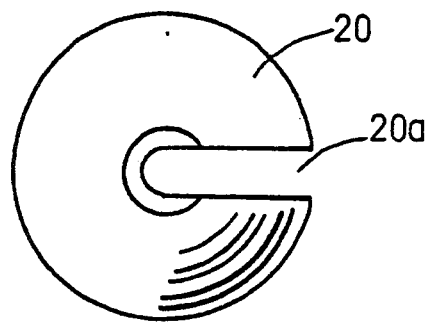
FIG. 5 is a plan view of a weight as used with a tank-ball valve.
Figure 6:
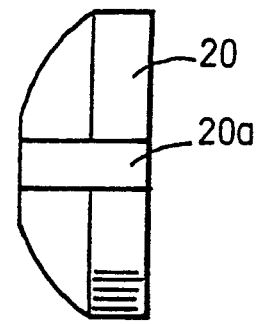
FIG. 6 is an elevational view of the weight shown in FIG. 5.

The weight 16 or 20 inserted into the flapper valve 14 or tank valve 18 respectfully are shaped to approximate the general interior shape of the respective valve. The weight 16 is shown in FIGS. 3 and 4 and the tank ball weight 20 is shown in FIGS. 5 and 6. In the preferred embodiment of a radial slot 16a, 20a respectifully is cut into the weight. The slot as shown in FIGS. 3 and 5, extends approximately midway into the weight and has an approximate non-critical width of 0.1875 inches (0.48 cm). The slot facilitates the insertion of the weight into the valve opening 14c, 18c as described infra.

The weight can be made of any material that has a specific gravity greater than that of water. Lead which has a specific gravity is 11.3 is preferred. However, zinc with a specific gravity of 7.1 or irons with specific gravities between 7.0 to 7.9 may also be used. In general, a weight weighting between 2 and 6 ounces (57.1 and 171.4 grams) will function. The substantial difference between these weights and the water insures that the valve will effectively close instantly. This weight also allows the weights 16, 20 to be made smaller which allows the valve material to deform and seat tightly in the valve seat 36. Additionally, in the instant invention, unlike the prior art, whether or not water enters the valve or if the water drains out valve is not relevant to the operation of the system 10.

To allow the system 10 to function properly, it is essential that the modified valves 14, 18 close quickly as the water in the tank 30 will totally empty in approximately four seconds. Therefore, in order to save water, the valve must close in less than 0.25 seconds. If not, as is the case in the prior-art foam filled valves, the valve will either float down or slowly sink, wasting water. In testing the modified valves 14, 18 it was found that because of their large weight/water ratio, they closed at a speed of 0.1 seconds.

Figure 10:
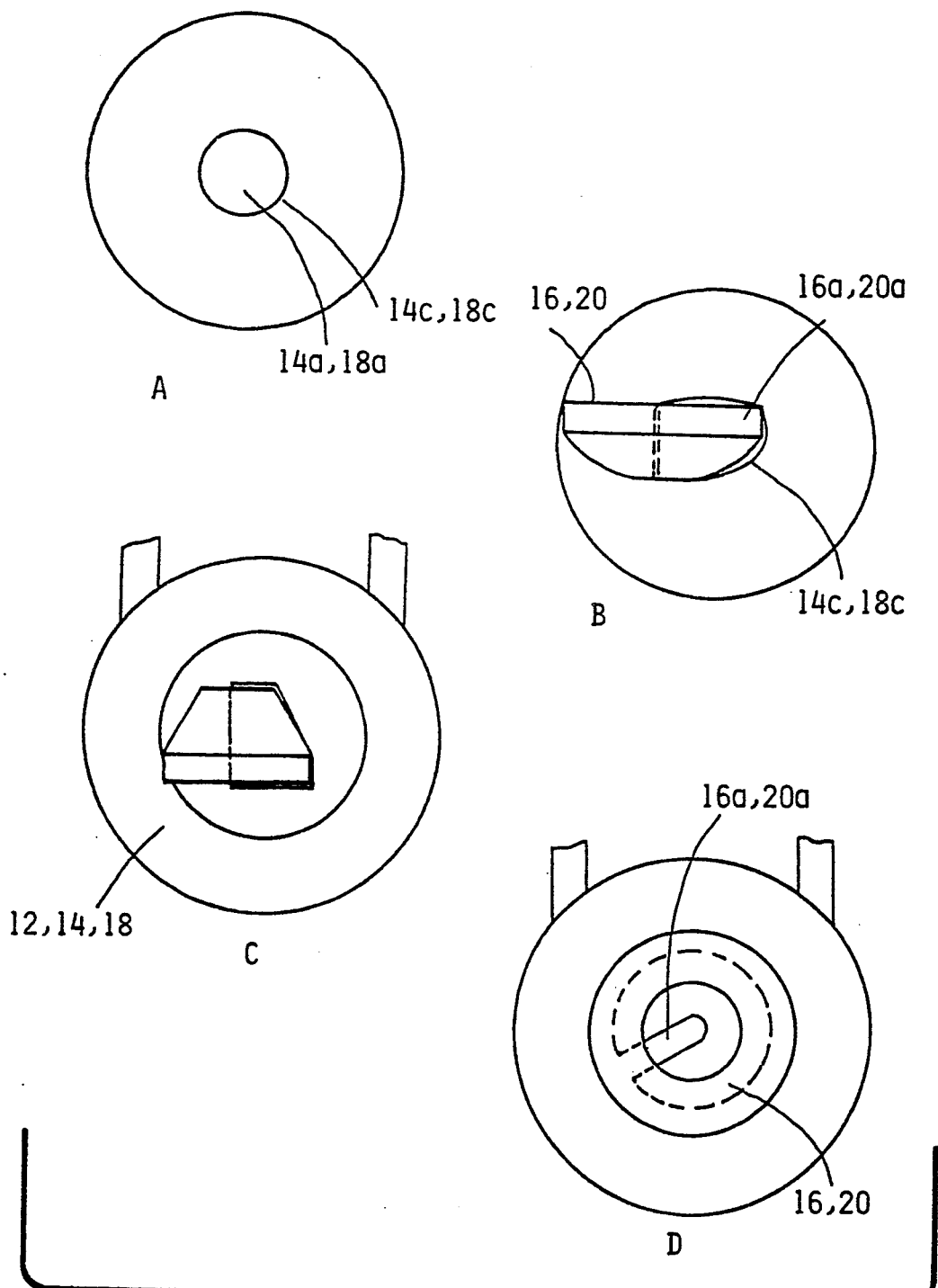
FIG. 10 is a sequential plan view illustrating how a weight is installed through the opening of either modified flush valves.

To modify the flush valve 12, the following steps as shown in FIG. 10 are performed:
a) remove the existing flush valve 14 or 18 from the toilet water tank 30,
b) hold the flush valve with the flush valve opening 14c, 18c facing upwardly,
c) group the weight 16, 20 and insert the radial slot 16a, 20a into the edge of the opening,
d) press and manipulate the weight until the weight falls into the opening with the concave surface of the weight facing the lower surface of the valve, and
e) install the modified flush valve in the toilet tank.

OPERATION

To operate the system 10, the following steps are performed:
a) to commence a toilet flush, depress the toilet flush handle 38 to cause the modified flush valve 14, 18 to lift from the valve seat 36,
  (1) to dispose liquid waste, depress handle 38 for approximately two seconds to effect a partial flush,
  (2) to dispose solid waste, depress handle 38 for approximately four seconds to effect a full flush,
b) release the toilet flush handle 38 after the expiration of the above selected time period to allow the valve 14, 18 to drop and seal against the valve seat 36.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. A selectable toilet-water-level flushing system that allows the quantity of water available for a toilet flush to be selected by a user, where said system comprises:
   a) a toilet bowl,
   b) a toilet water tank attached to the toilet bowl so that when a toilet flush occurs, the flush water from the tank drains into the toilet bowl, where the tank comprises in part:
   (1) a flush handle,
   (2) a bottom surface having a tank drain that includes a valve seat,
   (3) a flush valve removably mounted on said valve seat made of a resilient material and having a hollow interior with an opening therethrough and having on its upper end an attachment point operatively connected to said flush handle, and,
   (4) a weight inserted loosely into the flush valve opening where said weight modifies the flush valve so its combined weight exceeds the specific gravity of water to make said valve non-buoyant, wherein said weight is sized to allow a clearance between the circumferential perimeter of said weight and the inner surface of said flush valve so that said flush valve remains resilient near its lower perimeter to allow said valve to conform to and seal against the contour of the valve seat when said valve is in its seated position.

2. A selectable toilet-water-level flushing system that allows the quantity of water available for a toilet flush to be selected by a user, where said system comprise:
   a) a toilet bowl,
   b) a toilet water tank attached to the toilet bowl so that when a toilet flush occurs, the flush water from the tank drains into the toilet bowl, where the tank comprises in part:
   (1) a flush handle,
   (2) a bottom surface having a tank drain that includes a valve seat,
   (3) a modified flush valve removably mounted on said valve seat made of a resilient material and having a hollow interior with an opening therethrough and having on its upper end an attachment point operatively connected to said flush handle,
   (4) a weight inserted loosely into the flush valve opening said weight having a radial slot that facilitates the insertion of said weight into said opening where said weight modified the flush valve so its combined weight exceeds the specific gravity of water to make said valve non-buoyant.

3. A method of modifying a toilet flushing system to allow the quantity of water available in a toilet water tank for a toilet flush to be selected by a user, where said system incorporates a standard flush valve having an opening on one end, where, said flush valve is modified by performing the following steps:
   a) remove the existing said flush valve from the toilet water tank,
   b) hold said flush valve with the flush valve opening facing upwardly,
   c) obtain a weight having a radial slot and that is sized to loosely fit inside said flush valve,
   d) grasp said weight and insert said radial slot into the edge of the opening,
   e) press and manipulate said weight until said weight falls into said opening, and
   f) reinstall said modified flush valve in the toilet tank.

* * * * *